United States Patent [19]

Marin

[11] 3,886,543

[45] May 27, 1975

[54] DEBOUNCE LOGIC FOR KEYBOARD

[75] Inventor: Robert E. Marin, Park Ridge, Ill.

[73] Assignee: Teletype Corporation, Skokie, Ill.

[22] Filed: Nov. 29, 1973

[21] Appl. No.: 420,124

[52] U.S. Cl. .............................. 340/365 E; 328/51

[51] Int. Cl. .............................. H04l 15/06

[58] Field of Search .............................. 340/365 E

[56] References Cited

UNITED STATES PATENTS

| | | | |
|---|---|---|---|
| 3,448,254 | 6/1969 | Verhoeff | 340/365 E |
| 3,675,239 | 7/1972 | Ackerman | 340/365 E |
| 3,792,466 | 2/1974 | Arnold | 340/365 E |

*Primary Examiner*—Thomas B. Habecker

*Attorney, Agent, or Firm*—W. K. Serp; J. L. Landis

[57] ABSTRACT

A plurality of manually operated keyswitches are scanned by a multiplexer the output of which is fed through a shaping circuit to a demultiplexer. The multiplexer and demultiplexer are synchronized and the multiple outputs of the demultiplexer feed a plurality of debounce logic units, each of which is related to one of the keyswitches. Each debounce logic unit includes a digital storage means in the form of a first shift register cell receiving the shaped keyswitch signal from the demultiplexer and logic means responsive to the first signal and a second signal at the output of the first shift register cell. The logic means feeds a third signal to digital storage means in the form of a second shift register cell in response to a predetermined condition of the first and second signals. Additionally, a clock is provided for stepping the signals through the first and second shift register cells, in response to a steady state condition of a selected key.

15 Claims, 4 Drawing Figures

DEBOUNCE LOGIC FOR KEYBOARD

BACKGROUND OF THE INVENTION

This invention generally relates to debounce logic adapted for use with repetitively scanned manually operable keyswitches forming a keyboard and more particularly relates to such debounce logic which excludes extraneous signals either generated on both the actuation and/or deactuation of the keyswitches or occurring as random noise.

A wide variety of manually operable devices have been suggested for use as keyswitches forming component parts of a keyboard. Various mechanical as well as magnetically operable switches are in current use. Such devices serve to close a pair of contacts in response to the depression of a keytop by the operator thus completing an electrical circuit. The keyswitch closure signal is processed by an encoder converting the signal, which is identified by its scan position, into a desired notation such as binary or ASCII. The switches are electronically scanned at a high rate and means are often provided for producing a signal representative of an actuated key for generating one output response regardless of the number of times the actuated switch is scanned. A particular problem encountered with such arrangements is contact bounce. Depression of the keyswitch abruptly causes the contacts to close and as a result of the mass of the contacts and the instantaneous force to which they are subjected, the contacts tend to bounce generating extraneous closures which may send false signals to the encoder. Under such conditions, means are advisable for determining whether the switch has been successively actuated for purposes of generating a plurality of repetitive characters or whether the sequence of contact closures were generated by contact bounce.

A form of keyswitch which is finding increased utilization is the capacitively operated switch such as the device described in U.S. Pat. No. 3,671,822 issued June 20, 1972, to Theodore M. Leno entitled "Variable Capacitive Apparatus." The referenced switch includes a pair of conductive plates spaced to form a capacitor. Separation of the plates and thus their mutual capacitance is varied in response to manual actuation of a keytop. As a result of the physical mass of the plates forming the capacitor, and the abrupt force to which the plates are subjected, the capacitance value created by switch actuation follows a damped oscillation eventually reaching a steady state level in much the same manner as experienced in connection with the previously described electrically conductive switches. Further, upon release of the keytop, the capacitance value created similarly exhibits a damped oscillation until its nonactuated capacitive level is reached. Such oscillations generate extraneous closure signals and without appropriate filtering, the extraneous closure signals may appear to the encoder as repetitive key closures. As used hereinafter, the term keyswitch is intended to include such capacitive devices, as well as the more conventional mechanical keyswitches.

SUMMARY OF THE INVENTION

The illustrated embodiment is adapted for use with a keyboard including a plurality of selectively actuable keyswitches having first and second steady state conditions and initiating a first signal in response to a change of state. A first digital storage means is provided which receives the first signal at the input thereof. Logic means are included responsive to the first signal and to a second signal provided at the output of the first digital storage means. The logic means supplies a third signal to a second digital storage means in response to a predetermined condition of the first and second signals. Clocking means are included for stepping a signal through the first and second digital storage means whereby the second digital storage means provides an output signal in response to a change in the steady state condition of the selected keyswitch.

A main purpose of this invention is to provide a keyswitch debounce logic circuit which serves to exclude extraneous key closure signals so as to provide a unique single control signal for each definitive keyswitch actuation.

Other objects, advantages, and features of the invention will be more readily appreciated after reference to the following description and accompanying drawings.

DESCRIPTION OF THE ILLUSTRATED EMBODIMENT

General

Figure 1:
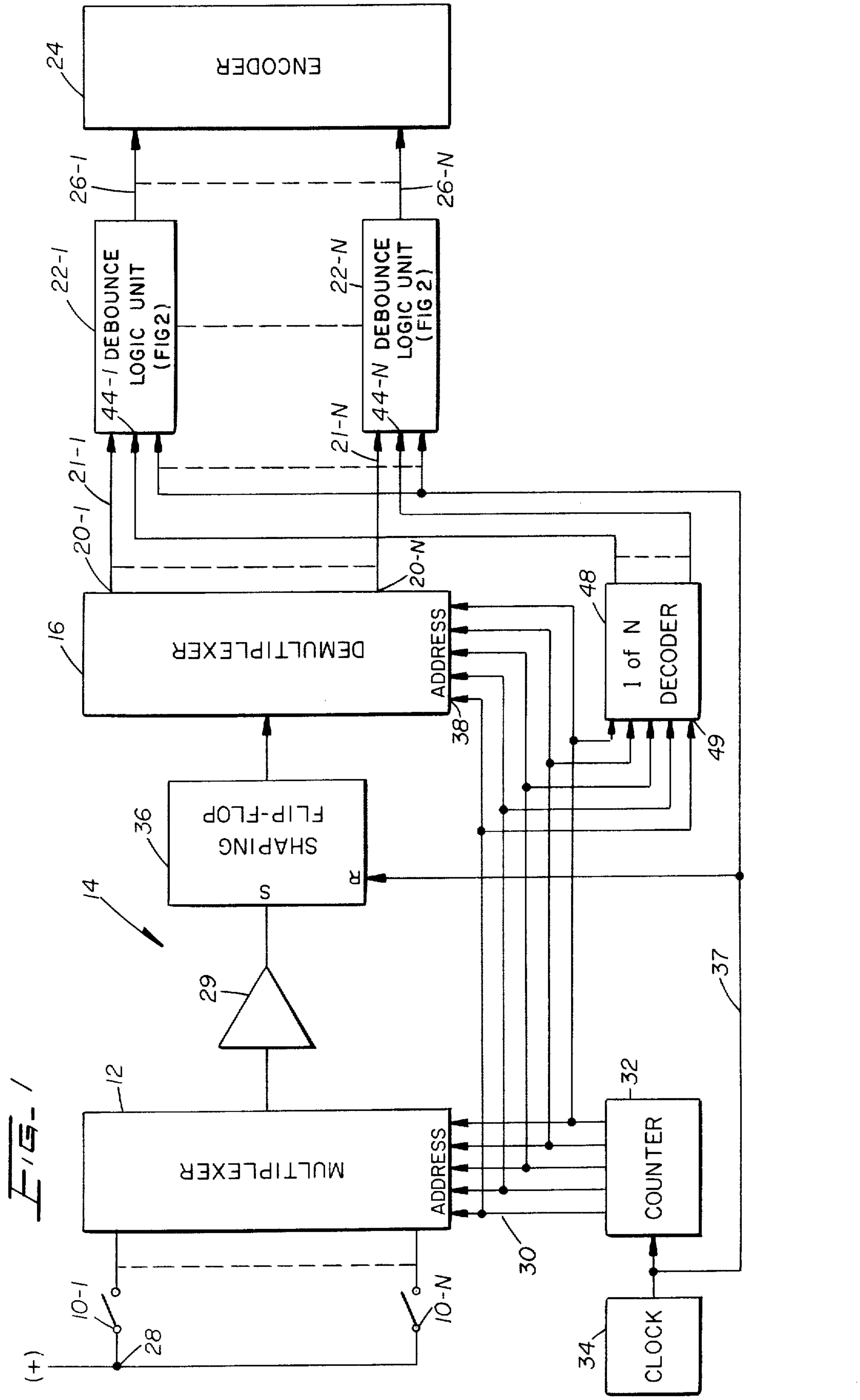
FIG. 1 is a schematic block diagram of an apparatus including certain features of this invention.

With respect to the embodiment illustrated in FIG. 1, the apparatus serves to sense the closure of one or more of a plurality of manually operable keyswitches 10-1 through 10-N. Each of the keyswitches 10 corresponds to either an alphanumeric key often referred to as a character key or an operational mode key. The character keys are used to initiate a single short-durationed closure signal representative of a selected alpha-numeric character and must be sequentially depressed to produce similar repetitive characters in much the same manner as one would operate a conventional typewriter. The mode keys are held in position for a sequence of characters; for example, a capitalization key may be depressed for a duration of time relating to the generation of several sequential capitalized characters. The keyswitches 10 are connected through a scanning multiplexer 12 and the output of the multiplexer is fed through a keyswitch-shaping circuit 14 to a demultiplexer 16. The demultiplexer 16 is synchronized with the multiplexer 12 and a plurality of outputs 20-1 through 20-N of the demultiplexer 16 are provided which correspond decimally to the keyswitch outputs. The outputs 20 present key closure signals which have been amplified and shaped in a manner to be subsequently further described. Corresponding to each output 20 from the demultiplexer 16 and connected thereto via lines 21-1 through 21-N are debounce logic units 22-1 through 22-N. Each of the debounce 22 logic unit 22 serve to exclude extraneous pulses which may occur upon the actuation or deactivation of the keyswitch and were it not for the debounce logic unit 22, would be sensed by an encoder 24 as multiple keyswitch closures. Additionally, the debounce logic unit 22 serves to prevent repetitive signalling of the encoder 24 for that character associated with an actuated keyswitch even though successive scanning signals are passed therethrough. Each of the outputs of the debounce logic unit 22 are fed to a related input of the encoder 24 via lines 26-1 through 26-N wherein the scan related signal is converted into a desired code such as binary or ASCII.

Scanning

More particularly, the movable contact member of each of the keyswitches 10, is connected to a positive power source via line 28 or to any other suitable signal source. Each fixed contact of each switch 10 is connected to one input of the multiplexer 12; that is, the multiplexer 12 has sufficient inputs to accommodate each of the keyswitch 10 fixed contacts. The output of the multiplexer 12 is fed to an amplifier 29 forming part of the keyswitch shaping circuit 14. Serving to address the multiplexer 12 are parallel lines 30 from a counter 32 which provides a binary output level sufficient to address the multiplexer 12 to N positions corresponding to the number of the keyswitches 10. Stepping the counter is a scanning clock 34. The clock rate is such that a selected one of the keys 10 will normally remain depressed for several scanning cycles. The counter 32 is selected to switch positions on the leading edge of a clock 34 pulse and thus each of the keyswitches 10 are sequentially connected to the multiplexer 12 output for a full clock cycle. The output of the amplifier 29 is fed to the set input of a shaping flip-flop 36. Resetting the shaping flip-flop 36 after each keyswitch has been scanned, is the output signal from the clock 34 which is fed to the reset input of the shaping flip-flop 36 via line 37. The output of the flip-flop 36 is fed to the input of the one to N demultiplexer 16 providing N output levels. Similarly each of the demultiplexer 16 outputs are connected to the input thereof for a full clock cycle. Each of the outputs of the demultiplexer 16 corresponds to one of the switch 10 inputs to the multiplexer 12. Serving to address the demultiplexer 16, the parallel output lines 30 from the counter 32 are fed to address inputs 38 of the demultiplexer 16 and in this manner the multiplexer 12 and demultiplexer 16 are synchronized and scan together at the frequency of the clock 34. The clock 34 steps the multiplexer 12 and the demultiplexer 16 so that, as each keyswitch 10 is successively sampled, the output signal therefrom is passed through the amplifier 29 and shaped by the flip-flop 36. The sampled keyswitch signal is used to set the flip-flop 36 and the clock 34 output connected via the line 37 resets the flip-flop 36 in anticipation of the sampling of the next sequential keyswitch.

Each output of the demultiplexer 16 is fed to an input of a corresponding keyswitch debounce logic unit 22. The number (N) of units 22 corresponds to the number of keyswitches 10 and each relates to a particular keyswitch. As will be subsequently described, each debounce logic unit 22 includes a shift register 42 stepped once for each scan of the keyswitcher 10. Additionally, each unit 22 includes an enable input 44-1 through 44-N connected to one output of a one of N decoder 48. The address inputs 49 of the decoder 48 are connected to the parallel output lines 30 from the counter 32; and thus the multiplexer 12, the demultiplexer 16 and the decoder 48 are synchronized. As each keyswitch 10 is scanned, the selected debounce logic unit 22, which corresponds to the keyswitch 10 being sampled, is enabled and the shift register 42 is stepped by the output of the clock 34 coupled via line 37. The output of each debounce logic unit 22 is fed to the keyswitch encoder 24 via the lines 26-1 through 26-N.

Filter

Figure 2:
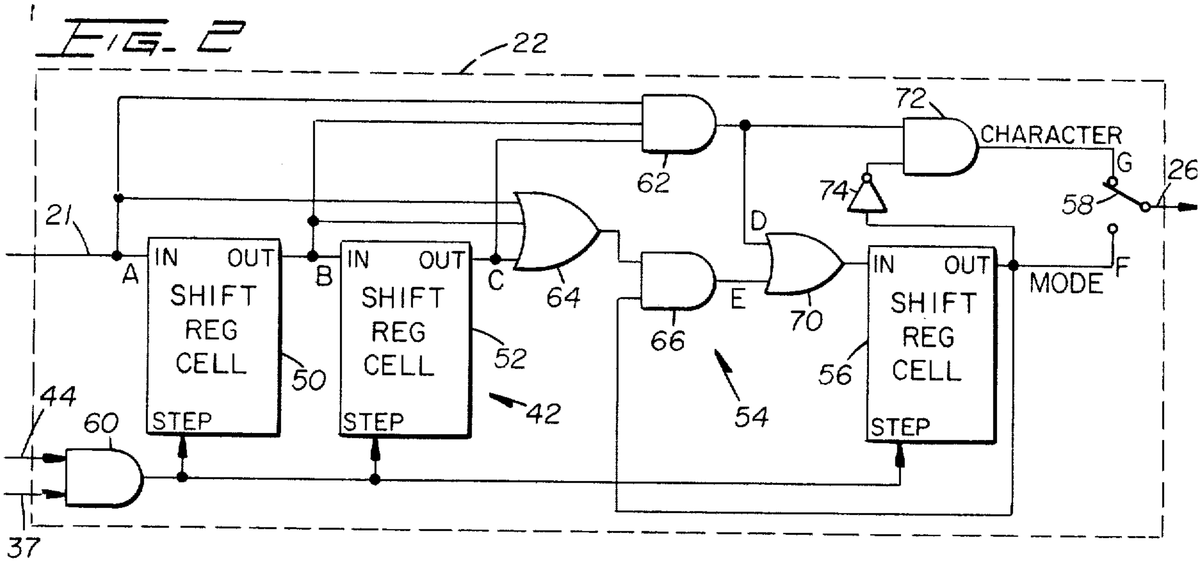
FIG. 2 is a detailed schematic diagram of a component of the apparatus illustrated in FIG. 1.

With particular reference to FIG. 2, the schematic of each debounce logic unit 22 is illustrated. Each of the units 22-1 through 22-N are of similar construction and include time delay means, comprising, in the embodiment illustrated, two digital storage means in the form of signal cell shift registers 50 and 52 connected in tandem. The output of each of the shift registers 50 and 52 is connected through a logic means 54 to a further time delay means, comprising a third digital storage means in the form of a single cell shift register 56, the output of which is connected to a fixed pole of a single pole double throw switch 58 and then to the encoder 24.

The debounce logic unit 22 includes an enable AND-gate 60, one input of which is connected to the corresponding output of the one of N decoder 48 via line 44 and the remaining input of the AND-gate 60 is connected to the clock 34 via the line 37. The output of the AND-gate 60 is connected to the step input of each of the shift register cells 50, 52, and 56. Serving to load the first shift register cell 50, the input thereof is connected via line 21 to the corresponding output 20 of the demultiplexer 16 which relates to an associated key 10. The output of the first shift register cell 50 is connected to the input of the second shift register cell 52 and the output of the second cell 52 feeds one input of a "debounce on make" triple input AND-gate 62 forming part of the logic means 54. An alternate input of the AND-gate 62 is connected to the output of the first shift register cell 50, and the remaining input of the gate 62 is connected to the input of the first shift register cell 52. To facilitate explanation, the signal level at the input of the first shift register cell 50 is designated A, which is also the level at one input of the AND-gate 62. The output of the first shift register cell 50 which is the signal level at the second input of the AND-gate 62 as well as the input to the second shift register cell 52 is designated B and the signal level at the output of the second cell 52 is designated C. It will be appreciated that when the signal levels A, B, and C are all high, the signal level, designated D, at the output of the debounce on make AND-gate 62 will also be high.

The debounce logic unit 22 additionally includes a triple input "debounce on break" OR-gate 64, each of the inputs thereof being connected to the A, B, C signal levels. When any of the three signal levels at the inputs of the OR-gate 64 are high, the signal level at the output of the OR-gate 64 will be high. The output of the debounce on break OR-gate 64 is connected to one input of a "debounce on break" dual input AND-gate 66; the alternate input of which is connected to the output of the third digital storage means or shift register cell 56. The signal level at the output of AND-gate 66 is designated E and the output of the shift register cell 56 designated F. The F level output of the shift register cell 56 is connected to one position of the selector switch 58 and is switched to the encoder 24 when the corresponding keyswitch 10 is a mode key. When both the output of the OR-gate 64 and the output F of the shift register cell 56 are high, the output E of the AND-gate 66 will also be high. This signal E passes through a dual input combining OR-gate 70 feeding a signal level to the input of the third shift register cell 56. The alternate input of the OR-gate 70 is connected to the output of the debounce on make AND-gate 62, the output D of which is also fed to one input of a dual input "character" AND-gate 72. Serving to drive the alternate input of the AND-gate 72 is an inverter 74 fed by the signal F at the output of the third shift register cell 56. The output of the "character" AND-gate 72, designated G, is connected to the remaining position of the selector switch 58 and is switched to the encoder 24 when the corresponding keyswitch 10 is a character key.

Figure 3:
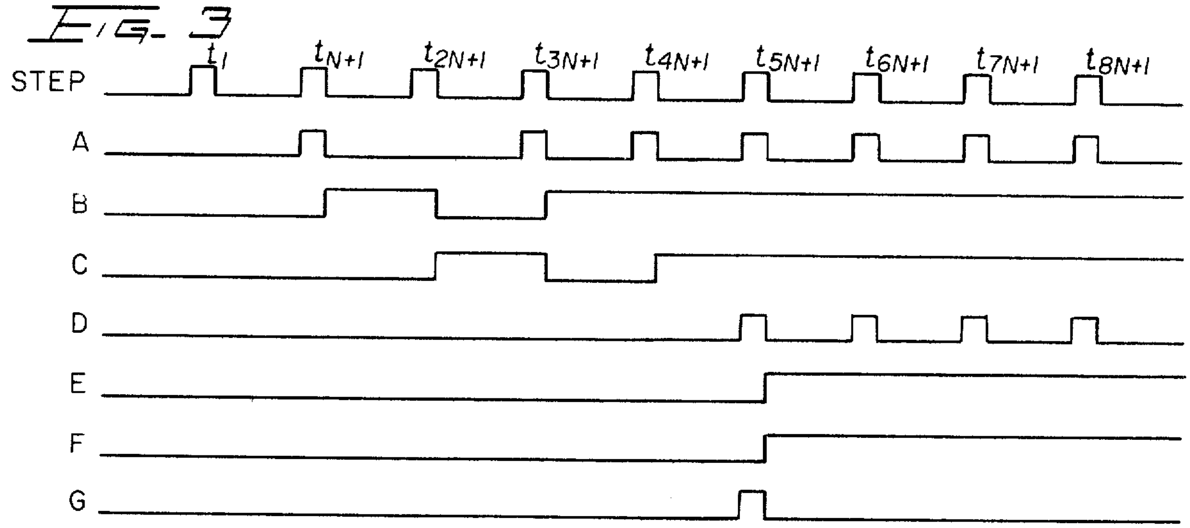
FIG. 3 is a timing diagram illustrating the operation of the component illustrated in FIG. 2 in a first mode of operation.

To clarify the operation of the debounce logic unit 22, the timing sequences of the various signal levels A through G are illustrated in FIG. 3 with respect to the operation of the debounce logic in response to the actuation of a keyswitch 10. The keyswitch 10 is assumed to bounce, that is provide on extraneous signal before arriving at its steady state condition. It will be appreciated that several extraneous signals may be generated; however, the single occurrence described will serve to illustrate the operation of the debounce logic unit 22. During a complete sampling cycle or scan, which for purposes, of explanation occurs in a time period N, each keyswitch 10 is sampled. The keyswitches are scanned so that a selected debounce logic unit 22 will be enabled by the decoder 48 for receipt of an incoming signal when the related keyswitch is coupled through the shaping means 14.

To further clarify this timing relationship, the step signals which shift the register cells 50, 52, and 56 on the trailing edge of the pulse have been designated $t_1$, $t_{N+1}$, $t_{2N+1}$, etc. where N is the time duration required for a complete scan of all of the keyswitches, there being N number of keyswitches. The shift register cell step signal is illustrated at FIG. 3, through the time period $t_1$ through $t_{8N+1}$. With respect to signal level A, it is assumed that the related keyswitch is activated between step pulses $t_1$ and $t_{N+1}$. On the leading edge of the next step pulse $t_{N+1}$ the demultiplexer 16 sends a keyswitch closure signal to the shift register 50. This closure signal is transferred to the output B of the first shift register cell 50 on the trailing edge of the step pulse $t_{N+1}$. The input A remains high for a full positive clock pulse so long as the related keyswitch is being sampled. In response to step pulse $t_{2N+1}$ signal A remains low indicating a nonactuated keyswitch which corresponds to a bounce condition. The input signal at $t_{N+1}$ being extraneous. Prior to $t_{3N+1}$ the keyswitch reaches its steady state level and provides a high signal level A to the input of the first shift register cell 50. Signal A goes high in response to each sampling of the actuated keyswitch throughout the period $t_{3N+1}$, to $t_{8N+1}$ and until released. With respect to signal B, which is one sampling cycle or clock pulse out of phase with the input signal A, signal B does not attain a steady state condition until $t_{3N+1}$. Similarly, the output of the shift register cell 52, which is designated signal C, does not reach a steady state condition until $t_{4N+1}$. The extraneous signal preceding the steady state condition, passes through the shift registers 50 and 52, without any operative effect, as illustrated. This extraneous pulse which started just prior to $t_{N+1}$ is coupled through the OR-gate 64 but is not fed to the input of the third cell shift register 56 due to the low state of signal level F at the alternate input of the debounce on break AND-gate 66. Further, the output of AND-gate 62 remains low until $t_{4N+1}$ since prior to this time at least one of the gate 62 inputs have been low.

At time period $t_{4N+1}$ signal levels A, B, and C are all high and the AND-gate 62 feeds a signal D through the combining OR-gate 70 which is transferred to the output F of the shift register cell 56 at $t_{5N+1}$ on the trailing edge of the step pulse. Signal level F, which is an output control signal constituting the "mode" output of the debounce logic unit 22 remains high through $t_{8N+1}$ and until the keyswitch is released; thus providing a continuing high output. As previously mentioned, the mode output is switched to the encoder 24 when the keyswitch relates to a mode key. Additionally, in response to the inverted signal level F and a high signal level D at $t_{5N+1}$, the AND-gate 72 output goes high providing a character signal G at time $t_{5N+1}$. Signal G remains high for the period $t_{5N+1}$. This high signal D is shifted through the register 56 on the next negative going pulse edge at $t_{5N+1}$ bringing level F high. The signal F at $t_{5N+1}$ passes through the inverter pulling one input of the AND-gate 72 low and terminating the character pulse G at $t_{5N+1}$. The output level G is switched to the encoder 24 when the keyswitch 10 to which the debounce logic unit 22 relates corresponds to a character keyswitch.

Thus, it will be appreciated that signals generated by noise or bounce upon closure of the keyswitch 10 are ignored while the debounce logic unit 22 provides a transitional character signal G and continuous mode signal F in response to a change in the "steady state" condition of the keyswitch; that is, a closure lasting at least three complete cycles of the clock 34. Thus, the debounce logic unit 22 provides a signal to the encoder 24 when the keyswitch 10 has reached a steady state actuated condition. The output control signal level F retains its steady state condition providing a mode signal for the entire duration of the keyswitch actuation whereas the "character" signal level G is transitional, supplying a single pulse to the encoder 24. It should further be noted that repetitive signaling by an actuated character keyswitch will not occur even though successive scanning pulses are passed therethrough, so long as the third shift register 56 output F remains high, because of the inverted signal to the character AND gate 72, through the inverter 74. A second actuation of the character gate 72 cannot occur until after the output F returns to zero, and the gate 72 is high by character signals for three subsequent consecutive sampling cycles. As will be explained hereafter, this is required where the same character is to be printed twice in succession, as for a double letter or repeated numerals, etc.

Figure 4:
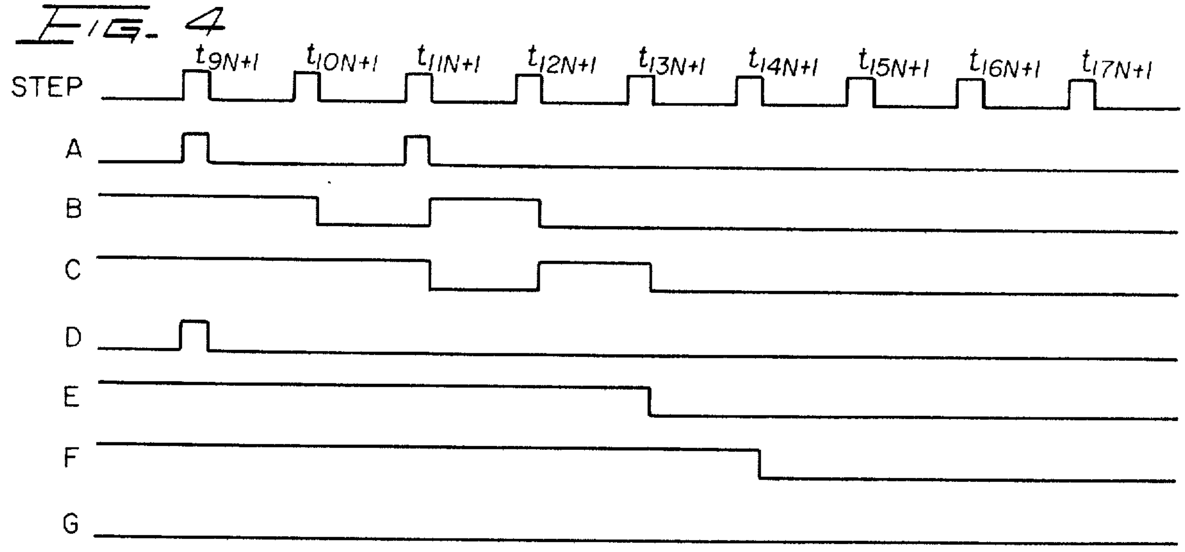
FIG. 4 is a timing diagram illustrating the operation of the component of FIG. 2 in a second mode of operation.

FIG. 4 is a timing diagram illustrating the operation of the debounce logic unit 22 with respect to the opening of a previously closed keyswitch 10 which generates one extraneous bounce pulse upon release. The various signal levels A through G are illustrated for comparison with the register step pulses for the time period $t_{9N+1}$ to $t_{17N+1}$. It is assumed that just prior to step pulse $t_{10N+1}$ the operator releases the keyswitch 10, causing the signal level at A to fall to zero during step pulse, $t_{10N+1}$ and to remain at zero from step pulse $t_{12N+1}$ through the end of the graph in FIG. 4. Due to keyswitch 10 bounce on break, an extraneous closure signal is created generating the high state of signal A at $t_{11N+1}$. Keyswitch 10 reaches its steady state condition just prior to $t_{12N+1}$. The leading edge of the extraneous pulse is shifted to the input of the second shift register at $t_{11N+1}$ and to the output of the second register at time $t_{12N+1}$. It will be noted that through the time period $t_{9N+1}$ to $t_{13N+1}$ at least one of the signal levels A, B, or C remains high. These high signal levels pass through the OR-gate 64 and the debounce on break AND-gate 66 the alternate output of which is held high by the signal F from the output of the third shift register cell 56. At time $t_{13N+1}$, the output of the debounce on break OR-gate 64 pulls down the signal level E which is fed to the OR-gate 70 to the input of the shift register cell 56. On the falling edge of the next step pulse at time $t_{14N+1}$, the mode signal F goes low. It will be appreciated that, as illustrated in FIG. 4, the extraneous signal generated upon deactuation of the keyswitch 10 did not interrupt the mode signal F nor produce a character pulse G.

The illustrated embodiment samples each keyswitch 10 once during each scan of the keyboard and when a sampled keyswitch 10 provides a closure signal for three consecutive scans a determination is reached that the keyswitch 10 has attained its steady state condition. However, if desired, the number of shift register cells may be increased so that a greater number X of scans are sampled before the filter arrives at a steady state determination, X being preset as the number of consecutive sampling cycles desired to move certain of screening out the extraneous signals, on both make and break of the contact. Alternatively, the clock rate may be adjusted to increase the time duration between samplings and thus afford the selected keyswitch a greater duration to "settle down."

Operation

In operation, the clock 34 drives the counter stepping the multiplexer 12 successively through each keyswitch 10 position. The signal level of each keyswitch 10 is amplified by the amplifier 29 and the output thereof shaped by the shaping flip-flop 36. Additionally, the address input of the demultiplexer 16 is synchronized with the address of the multiplexer 12 thereby feeding the amplified and conditioned output from each keyswitch 10 to its respective debounce logic unit 22. Each of the units 22 are enabled in synchronization with the demultiplexer 16. Upon closure of a keyswitch 10, the closure signal is stepped into the first shift register cell 50 and is then stepped from one cell position to the next in response to a complete scan of the keyswitches 10. To introduce a steady state closure signal to the encoder 24 a signal must exist simultaneously at all of the input signal levels A, B, and C to the gating means 54. Such a condition occurs when three successive samplings of a selected keyswitch 10 have provided a similar signal indicating that the keyswitch 10 has attained a steady state condition. In response to the presence of a high signal level simultaneously at A, B, and C, a signal D is coupled through the AND-gate 62 which is stepped through the OR-gate 70 into the third shift register cell 56 generating a continuous mode signal at the F and a single pulse at the G outputs. In response to release of the keyswitch 10, three successive scans of the keyswitch will provide a low level signal before the mode output F falls to a low level The shift register 56 delays the output from the OR-gate 70 (D or E) one additional sampling cycle, before providing the output control or mode signal F, which is applied through the inverter 74 to prevent a second operation of the character signal AND-gate 72 until after the switch 10 has reopened and remained reopened for three consecutive sampling cycles, as indicated by the AND-gate 66 going low when all three input signals A, B, and C are simultaneously low, which is the debounce on break condition previously described. Only then does the E signal and the output from the OR-gate 70 go low, which in turn lowers the mode signal F to zero (FIG. 4E) after a one cycle delay passing through the shift register 56, which re-enables the AND-gate 72 so that another character signal can be generated in response to the next steady-state make signal; which disables the AND-gate 66 until after the next steady-state make cycle, plus one cycle delay through the shift register 56. Thus, the illustrated apparatus serves to exclude extraneous signals of any kind, including those generated as a result of bounce on actuation, as well as deactuation of a keyswitch.

While this invention has been particularly shown and described in connection with an illustrated embodiment, it will be understood that various changes in form and detail will be made without departing from the spirit and scope of the invention as set forth in the following claims.

What is claimed is:

1. Debounce logic for use with a keyboard having a plurality of selectively actuable sequentially scanned keyswitches; each of said keyswitches being operable between a first steady state condition and a second steady state condition and initiating a first signal (A) in response thereto comprising:

first digital storage means receiving said first signal (A) from a selected keyswitch;

first logic means responsive to said first signal (A) and a second signal (B) provided at the output of said first digital storage means and related to the operative condition of said selected keyswitch during a previous scan;

said first logic means supplying a third signal (D, E) to a second digital storage means in response to a predetermined condition of said first (A) and second (B) signals; and means for synchronizing the stepping of said signals through said first and second digital storage means whereby said second digital storage means provides an output signal (F, G) in response to a steady state condition of said selected keyswitch as indicated by the same operative condition during consecutive scans.

2. The apparatus of claim 1 wherein said first logic means provides said third signal (D) in response to the simultaneous presence of said first (A) and second (B) signals.

3. The apparatus of claim 2 which further includes second logic means responsive to said third signal (D) and the output (F) of said second digital storage means and provides a transitory signal (G) in response to the change of the key from the first steady state condition to the second steady state condition.

4. The apparatus of claim 2 which further includes third logic means responsive to at least one of said first (A) and second (B) signals and providing an output signal (E) to said second digital storage means whereby said output signal (F) from said second digital storage means changes level upon the operation of said key from the second steady state condition to the first steady state condition.

5. The apparatus of claim 1 wherein said first logic means is responsive to at least one of said first (A) or second (B) signals and provides said third signal (E) to said second digital storage means whereby said output signal (F) from said second digital storage means changes level in response to the operation of the key from the second steady state condition to the first steady state condition.

6. The apparatus of claim 5 which further includes second logic means providing a fourth signal (D) to said second digital storage means in response to the simultaneous presence of said first (A) and second (B) signals.

7. The apparatus of claim 6 which further includes third logic means responsive to said fourth signal (D) and the output (F) of said second digital storage means and providing a transitory signal (G) upon the operation of the key from the first steady state condition to the second steady state condition.

8. The apparatus of claim 2 which further includes third digital storage means receiving the output (B) of said first digital storage means and providing a third signal (C) to said first logic means;

said first logic means including a first AND-gate receiving said first (A) second (B) and third (C) signals and feeding an output signal (D) to a second gating means and said second digital storage means whereby said signal (D) is fed to the input of said second digital storage means upon the simultaneous presence of said first (A) second (B) and third (C) signals in response to the operation of the key from the first steady state condition to the second steady state condition.

9. The apparatus of claim 8 which further includes a second AND-gate; one input of said second AND-gate being connected to the output of said first AND-gate and an alternate input of said second AND-gate responsive to the output (F) of said second digital storage means.

10. The apparatus of claim 9 which further includes an OR-gate, the inputs of said OR-gate receiving said first (A) second (B) and third (C) signals and the output of said OR-gate being fed to one input of a third AND-gate an alternate input of said third AND-gate receiving the output (F) of said second digital storage means and the output of said third AND-gate feeding the input of said second digital storage means.

11. The apparatus of claim 5 which further includes a third digital storage means receiving the output (B) of said first digital storage means and providing a third (C) signal and the output of which is fed to one input of an AND-gate an alternate input of said AND-gate receiving the output (F) of said second digital storage means and the output (E) of said first AND-gate feeding the input of said second digital storage means.

12. The apparatus of claim 11 which further includes a second AND-gate receiving said first (A), second (B) and third (C) signals and feeding an output signal (D) to said second digital storage means and to the input of a third AND-gate the alternate input of said third AND-gate being responsive to the output (F) of said second digital storage means.

13. An apparatus for use with a selectively actuated keyboard including a plurality of keys each key being operable between a first steady state condition and a second steady state condition comprising: signal shaping means;

first switching means for sequentially connecting each of said keys to said shaping means;

second switching means synchronized with said first switching means and serving to feed the output of said shaping means to a selected one of a plurality of, debounce logic units each of said debounce logic units corresonding to one of said keys and receiving a shaped signal (A) therefrom;

said debounce logic units including a first digital storage means receiving said shaped signal (A);

first logic means responsive to said shaped signal (A) and a second signal (B) provided at the output of said first digital storage means;

said first logic means supplying a third signal (D, E) to a second digital storage means in response to a predetermined condition of said first (A) and second (B) signals; and a clock for synchronizing the operation of said first and second switching means and for stepping a signal through said first and second digital storage means whereby said second digital storage means provides an output signal (F) in response to a steady state condition of a selected key.

14. In combination with a system for producing control signals in response to the state of operation of a make or break switch contact, of the type wherein the state of the switch is periodically sampled during successive time cycles, the system being of the type wherein it sometimes gives "extraneous" signals, defined as signals which appear to indicate the state of the contact but which are present for a time interval less than X consecutive sampling cycles, X being a preset small whole number greater than 1; a debounce logic circuit for screening out such extraneous signals, which comprises:

means for providing X sequential, distinct status signals, a first one of said status signals indicates the sampled state of the contact during the present sampling cycle, and the additional ones of said status signals indicate the state of the contact during the X−1 previous cycles, said status signal providing means including time-delay means for providing the X−1 additional status signals related to the state of the switch during the X−1 previous sampling cycles; and logic means, responsive only to all X status signals, for providing an output control signal which assumes a first level only after all X input signals have indicated a made state of the contact during X consecutive cycles, and control signal thereafter changes to a second level only after all X status signals have indicated a broken state of the contact during X consecutive cycles.

15. A debounce logic circuit as recited in claim 14, for use in a system wherein it is desired to produce a single output operating pulse to operate a controlled mechanism only whenever the contact has been in a first state for X consecutive sampling cycles and thereafter changes to a second state and remains in the second state for X consecutive cycles, further comprising:

an additional time delay means for delaying the output control signal for a predetermined time delay;

second logic means, responsive to all X input signals simultaneously indicating that the contact has been in the second state for X consecutive cycles, for initially generating the output operating pulse; and means, responsive to the output control signal after said additional time delay, for preventing a second operation of said second logic means until after the contact has changed to the first state and has remained in the first state for X consecutive cycles.

* * * * *